United States Patent [19]

Hatcher

[11] Patent Number: 5,213,401

[45] Date of Patent: May 25, 1993

[54] SUPPORT FOR COMPUTER TERMINAL AND COMPUTER KEYBOARD

[75] Inventor: David O. Hatcher, Williamsville, N.Y.

[73] Assignee: Posting Equipment Corporation, Buffalo, N.Y.

[21] Appl. No.: 702,783

[22] Filed: May 17, 1991

[51] Int. Cl.$^5$ .............................................. A47B 88/18
[52] U.S. Cl. .................................. 312/208.1; 312/322
[58] Field of Search ...................... 108/143; 312/208.1, 312/341.1, 330.1, 322

[56] References Cited

U.S. PATENT DOCUMENTS

| | | | |
|---|---|---|---|
| 4,441,771 | 4/1984 | Roesler | 312/330.1 |
| 4,483,572 | 11/1984 | Story . | |
| 4,496,200 | 1/1985 | Hagstrom et al. . | |
| 4,620,489 | 11/1986 | Albano | 108/143 X |
| 4,624,510 | 11/1986 | Jedziniak . | |
| 4,635,893 | 1/1987 | Nelson . | |
| 4,646,658 | 3/1987 | Lee | 108/143 |
| 4,717,112 | 1/1988 | Pirkle . | |
| 4,834,470 | 5/1989 | Pinnow et al. | 312/330 X |
| 4,901,972 | 2/1990 | Judd et al. . | |
| 4,931,978 | 6/1990 | Drake et al. | 108/143 |

Primary Examiner—Peter R. Brown
Attorney, Agent, or Firm—Hodgson, Russ, Andrews, Woods & Goodyear

[57] ABSTRACT

An improved support assembly for a computer terminal and a computer keyboard. The assembly includes two major components, a computer terminal support (12) and a keyboard support (14). The two components can be assembled together in one of two manners by fastener assemblies (16). When assembled in one manner, the computer terminal support will be shifted from a storage position to a use position which is nearly horizontal. When assembled in the other manner, the keyboard support will be in a use position which is inclined and extends below the bottom surface of the computer terminal support.

11 Claims, 2 Drawing Sheets

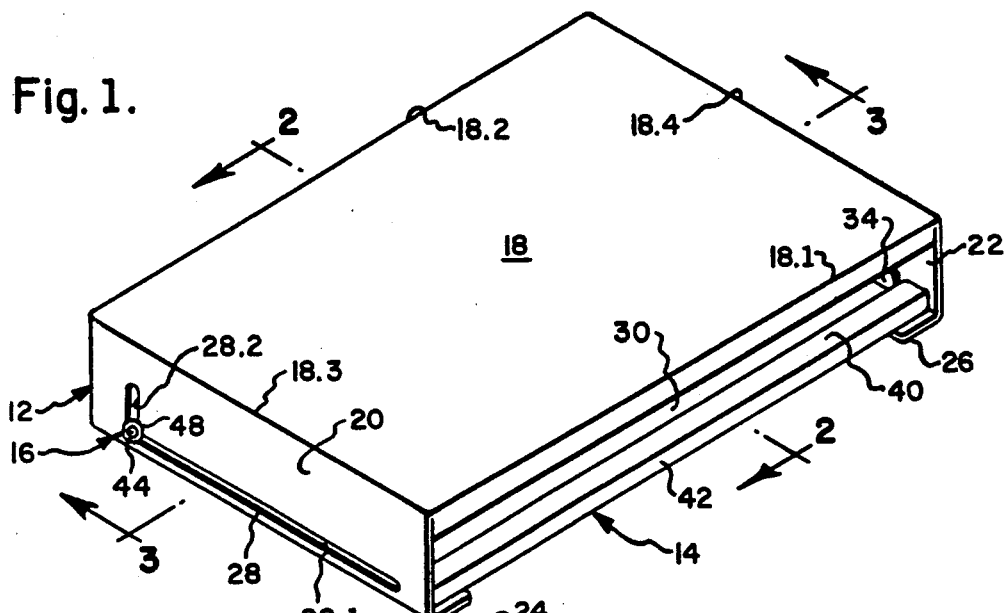
Fig. 1.
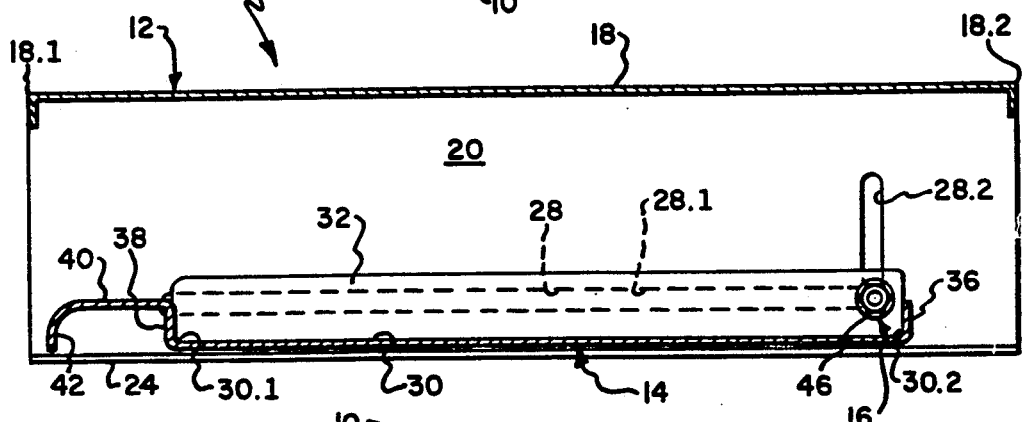
Fig. 2.
Fig. 3.

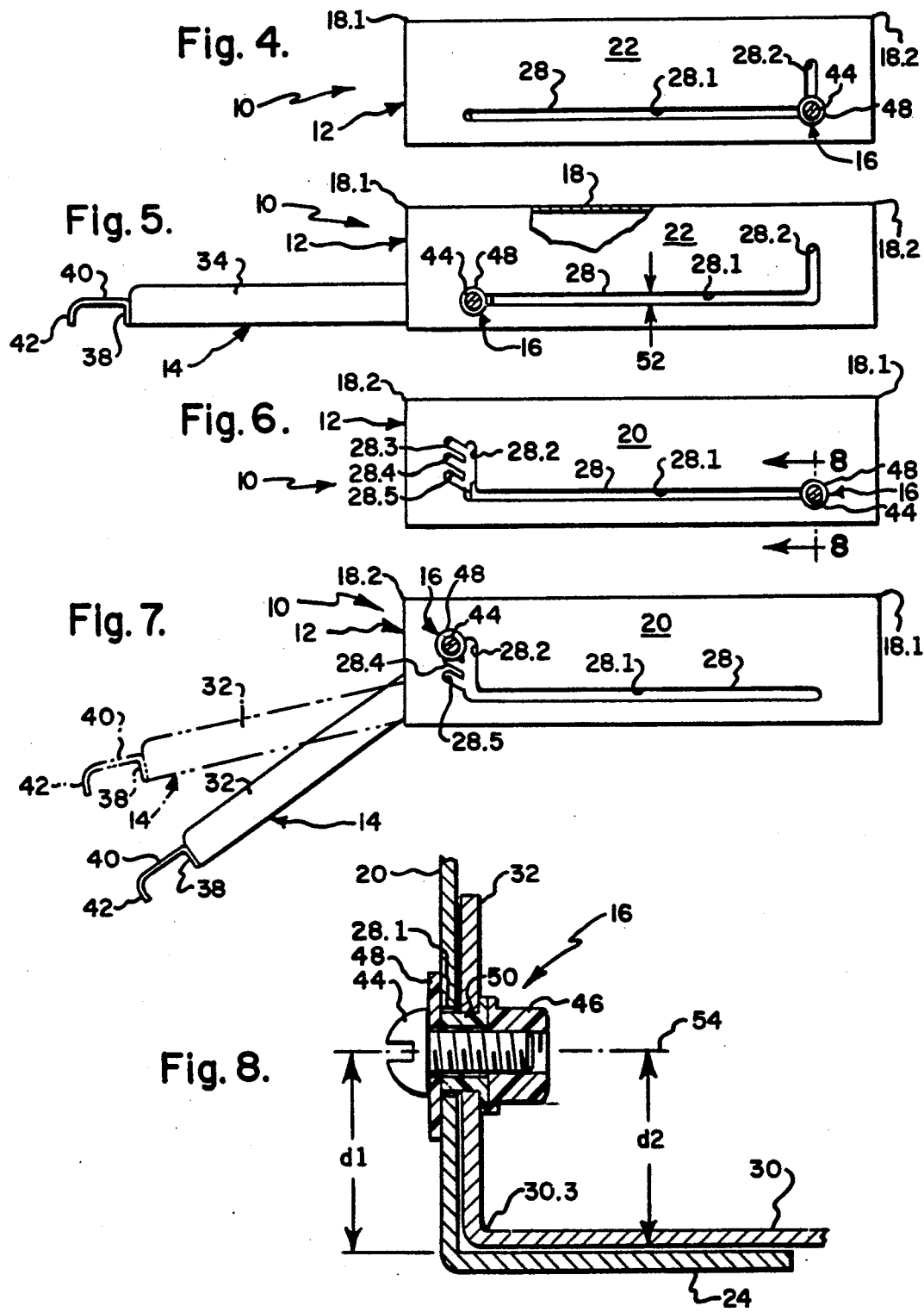

SUPPORT FOR COMPUTER TERMINAL AND COMPUTER KEYBOARD

FIELD OF THE INVENTION

The present invention relates generally to supports, and more particularly to an improved support for a computer terminal and a computer keyboard wherein the keyboard support is movable from a stored position within the computer terminal support to an extended use position, the keyboard support capable of being assembled in one of two manners so that when the keyboard support is assembled one way and placed in its use position it will extend parallel to the top of the computer terminal support, and when assembled in another way and placed in its use position it will be at an inclined position.

BRIEF DESCRIPTION OF THE PRIOR ART

Computer terminal and keyboard supports are well known in the prior art for supporting a keyboard below a computer terminal. Typical examples are shown in U.S. Pat. Nos. 4,483,572; 4,496,200; 4,624,510; 4,635,893; 4,717,112; and 4,901,972. Typically the computer support is designed for use either on a desk top or on a lower surface which would normally receive a typewriter or other similar office equipment having a keyboard. When the computer terminal support is placed upon a desk top and carries a keyboard support which is stored within the computer terminal it should be obvious that a keyboard stored on the keyboard support would be at or above the height of the desk top. Such a level is too high for good operator ergonomics. Therefore, when the computer terminal support is adapted to be placed upon a table top, the keyboard support has been designed in such a manner that when the keyboard support is moved to an extended use position it will either be lowered or placed in an inclined position to facilitate use by the operator in a more ergonomic manner. When the computer terminal support is adapted to be placed upon a lower surface which would normally received a typewriter or like, it is presumed that the keyboard will be at the proper height and therefore the keyboard will be typically be shifted from a storage position just above the surface of the support to a forward or extended position where the keyboard is at the same level as it was in the storage position.

Computer terminal and keyboard support assemblies are known in the prior art which can be placed at either height. One such example is shown in U.S. Pat. No. 4,717,112. In this patent the computer support is adapted to be placed upon a surface and the keyboard can be carried by a keyboard support which, when in its extended position, can be disposed either in a first position where it is parallel to the top of the table, or an inclined position where it may be disposed below the top surface of the table. While the design in the foregoing patent overcomes some of the disadvantages of the prior art, it is a relatively complex design requiring that the keyboard support be of an extended length so that there cannot be compact storage of the keyboard support underneath the computer monitor. In addition, the foregoing design because of is relative complexity is also relatively expensive.

In U.S. Pat. No. 4,496,200 another mechanism is disclosed which may be utilized for supporting a keyboard assembly in one of two use positions. However, as can be seen from the foregoing patent, the mechanism disclosed therein is also relatively complex and therefore somewhat costly.

OBJECTS AND SUMMARY OF THE INVENTION

It is an object of the present invention to provide a support for a computer terminal and a computer keyboard which may be assembled either in a first manner so that the keyboard support when extended to its working position is parallel to the top surface of the computer support, or which may be assembled in a second manner so that when the keyboard support when extended to its working position is disposed at an angle and below the bottom of the computer support.

It is a further object of the present invention to provide a support of the type set forth above which is relatively inexpensive.

The foregoing object and other objects and advantages of this invention will become more apparent after a consideration of the following detailed description taken in conjunction with the accompanying drawings in which a preferred form of this invention is illustrated.

BRIEF DESCRIPTION OF THE DRAWINGS

FIG. 1 is a perspective view of the computer and keyboard supports of this invention assembled in such a manner that the keyboard support, when extended, will be parallel to the top surface of the computer support.

FIG. 2 is a sectional view taken generally along the line 2—2 in FIG. 1.

FIG. 3 is a sectional view taken generally along the line 3—3 in FIG. 1.

FIG. 4 is a right side elevational view of the assembly shown in FIG. 1 with the keyboard support in its retracted, inoperative, or storage position.

FIG. 5 is a view similar to FIG. 4 showing the keyboard support in its extended position.

FIG. 6 is a view of the keyboard and terminal supports wherein the keyboard support is assembled to a slightly modified terminal support in its alternate manner.

FIG. 7 shows the computer terminal and keyboard supports when assembled in the manner shown in FIG. 6, but with the keyboard support in its extended position where it can be seen that the keyboard support extends below the bottom surface of the computer support.

FIG. 8 is a sectional view taken generally along the line 8—8 in FIG. 7 showing how the keyboard support is mounted upon the computer support.

DETAILED DESCRIPTION

With reference now to the various figures in which a preferred form of this invention has been illustrated, it should be noted that the keyboard and terminal support of this invention is indicated generally at 10 and consists of a computer terminal support or base indicated generally at 12 and a computer keyboard support or holder indicated generally at 14. A pair of fastener assemblies, indicated generally at 16, is utilized to interconnect the computer keyboard holder with the computer terminal base in either a first manner, shown in FIGS. 1 through 5, or in a second manner, shown in FIGS. 6 and 7. When the various components of this invention are assembled in the manner shown in FIGS. 1 through 5, the keyboard holder, when extended to its use position shown in FIG. 5, will be generally parallel to the top surface of the computer terminal support 12. When the components are assembled in the manner shown in FIGS. 6 and 7 the keyboard holder, when extended to its use position, will be disposed at an inclined position as shown in FIG. 7.

The computer terminal support or base 12 includes a generally planar top portion 18 which is adapted to support a computer terminal, the top portion having a first side 18.1, a second side 18.2 and opposed first and second ends 18.3 and 18.4, respectively. Extending downwardly from the top portion at the ends 18.3 and 18.4 are a pair of first and second parallel terminal base sidewalls 20, 22, respectively. As can be seen each of the sidewalls 20, 22 extends from the first side 18.1 to the second side 18.2 of the top portion. The computer terminal support 12 is further provided with spaced apart bottom wall portions 24, 26 (FIG. 3) which extend inwardly from the sides 20, 22, respectively, the bottom wall portions 24 and 26 being parallel to the top portion 18. In the preferred form the computer terminal support is formed of sheet metal.

Each of the sidewalls 20, 22 is provided with an L-shaped slot 28, the slot in the sidewall 20 being in register with the slot in sidewall 22. Each of the slots 28 has one leg 28.1 which is parallel to the planar top portion 18 and another leg 28.2 which extends vertically above one end of the leg 28.1. While the leg 28.2 may be just a vertical slot as shown in FIGS. 1, 2, 4, and 5, it may be provided with a plurality of notches 28.3, 28.4, and 28.5 as best shown in FIGS. 6 and 7. By having such notches it is possible to adjust the keyboard support when disposed in the manner shown in FIG. 7.

The keyboard support includes a generally planar intermediate portion 30, which portion has first and second sides 30.1, 30.2 (FIG. 2) and first and second ends 30.3 and 30.4 (FIG. 3). A pair of parallel keyboard holder sidewalls 32, 34 extend upwardly from the ends 30.3, 30.4 of the intermediate portion 30, the sidewalls 32, 34 extending between the first and second sides 30.1 and 30.2, as can best be seen from FIG. 2. The sidewalls 32, 34 are provided with aligned apertures (no number), each of which receives a fastener assembly 16. Adjacent the second side 30.2 is a rear retaining wall 36. Similarly, adjacent the front side 30.1 is a front wall 38, the front wall being provided with a forwardly extending horizontal extension 40 from which a downwardly extending engagement portion 42 is secured.

In the embodiment illustrated, each of the fastener assemblies may include a screw 44 having a head and a shank, a flange nut 46, a washer 48, and a flanged tubular bearing or bushing 50. The bushing 50 has a diameter just slightly less than the height of the slot 28.1, which height is indicated by the arrows 52 in FIG. 5. This will permit the fastener assembly to freely slide upon the slot. When the fastener assembly 16 is assembled through a slot and through an aperture in one of the sidewalls 32, 34, its centerline 54 will essentially coincide with the centerline of the aperture (no number) in the associated sidewall 32 or 34. Other fastener assemblies may be utilized.

When the various parts are assembled in the manner shown in FIGS. 4 and 5, the keyboard support 14 can be extended from the storage position, shown in FIG. 4, to the in-use position shown in FIG. 5 and then back again to the storage position. When in the storage position the vertical slot portion 28.2 may be engaged by the associated fastener assembly when the support is vibrated to prevent the keyboard support from "walking" out of the computer terminal base 12. Normally though, friction will hold the support in place. However, the keyboard support 14 can be extended to its use position shown in FIG. 5 where its base will be parallel to the top portion 18 of the base 12. In connection with this it should also be noted that the centerline of the slot leg 28.1 is spaced a distance d1 above the top of bottom wall 24 or 26 a distance slightly in excess of the distance d2 between the centerline of the aperture of each of the keyboard holder sidewalls and the bottom surface of the generally planar intermediate component 30. Because of this dimensional relationship, the keyboard holder will be in an essentially or nearly horizontal position when the keyboard holder is extended to its use position with the parts assembled in the manner shown in FIGS. 1 through 5.

With the parts assembled in the alternate position shown in FIGS. 6 and 7, when the keyboard holder is shifted from its storage position within the computer terminal support base to its use position, it will be shifted in a direction towards the second side 18.2 of the computer base. When fully extended in this position, the fastener assembly 16 can be shifted upwardly in the vertical leg 28.2 until the fastener assembly engages the top of the vertical leg which will position the keyboard holder in the inclined position indicated in full lines in FIG. 7. However, if it is desired to position the keyboard holder in a position which is not as inclined as that shown in FIG. 7, the notches 28.3, 28.4, and 28.5 may be provided so that the fastener can be positioned in one of the notches 28.3, 28.4, 28.5 to suitably adjust the position of the keyboard holder as shown in phantom lines.

It should be apparent that by providing an assembly which can be readily assembled in one of two manners wherein the keyboard holder extends either to one side where it is maintained in an essentially horizontal position parallel to the top surface of the base, or to the other side where it may incline downwardly that an assembly has been provided which may be used in a number of environments to provide suitable ergonomic keyboard supports no matter where the assembly is positioned, which assembly may be manufactured at relatively low cost.

While a preferred embodiment in which the principles of the present invention has been illustrated in the accompanying drawings and discussed above, it should be understood that the inventor does not intend to be limited to the particular embodiment shown and described above, but that, in fact, intends to be limited only to all equivalent structures which fall within the scope of the following claims.

What is claimed is:

1. The combination of a computer terminal base and a computer keyboard holder which is capable of being assembled to the base in two ways, the keyboard holder when assembled a first way being movable from a storage position within the base to a first use position to a first side of the base, the first use position being generally parallel to the top of the base, and the keyboard holder when assembled a second way being movable from a storage position within the base to a second use position to a second side of the base, the second use position being at an incline to the top of the base; the combination comprising:

a computer terminal base including a generally planar top portion which is adapted to support a computer terminal, a pair of parallel terminal base sidewalls extending downwardly from ends of the top portion and between first and second sides of the base, each of the pair of terminal base sidewalls being provided with a slot extending between first and second portions of the terminal base sidewall adjacent the first and second sides of the base, respectively, the end of the slot in the first portion being lower than the end of the slot in the second portion, and bottom wall means for supporting the computer terminal base upon a desk or the like, the bottom wall means being interconnected to the lower edge of each of the pair of terminal base sidewalls, the bottom wall means being disposed below and generally parallel to the planar top portion;

a computer keyboard holder including a generally planar intermediate component which is adapted to support a computer keyboard, the generally planar intermediate component having first and second side portions and opposed end portions, a pair of parallel keyboard holder sidewalls extending upwardly from the end portions of the intermediate component and between the first and second side portions, each of the pair of keyboard holder sidewalls being provided with an aperture adapted to be placed in registry with the slot in an associated terminal base sidewall; and fastener means for securing the computer keyboard holder to the computer terminal base in one of said two ways, the fastener means when securing the keyboard holder to the computer terminal base passing through the aperture in each of the keyboard holder sidewalls and a slot in an associated terminal base sidewall for sliding movement between the ends of the slot whereby when the parts are assembled the keyboard holder may be moved between storage and use positions and the fastener means cooperate with the ends of the slots to hold the keyboard holder either in the second use position inclined to the top of the base effected by the fastener means sliding upwardly in the respective slot ends in the second terminal base sidewall portions or in a storage position within the base when assembled in the second way to extend out the second side of the base for use, and whereby the keyboard holder may be disconnected from the base, removed out the second side, inserted in the first side to extend out the first side of the base for use, and reconnected to the base to be assembled in the first way to hold the keyboard holder either in the first use position parallel to the top of the base or in a storage position within the base.

2. The combination set forth in claim 1 wherein each of the slots in the terminal base sidewalls is generally L-shaped, one leg of the L-shaped slot being parallel to the planar top portion of the computer terminal base, and the other leg of the L-shaped slot extending vertically above one end of the leg of the L-shaped slot which is parallel to the planar top portion.

3. The combination set forth in claim 2 wherein each of the slots includes a plurality of vertically spaced apart notches which intersect the vertical leg for receiving the fastener means at various heights.

4. The combination as set forth in claim 1 wherein the fasteners means includes two spaced-apart fastener assemblies.

5. The combination of a computer terminal base and a computer keyboard holder assembly together in such a manner that the keyboard holder may be moved from a storage position within the base to a first use position to a first side of the base, the keyboard holder in the first use position being nearly parallel to the top of the base; the combination comprising:

a computer terminal base including a generally planar top and bottom wall portions, the top portion being adapted to support a computer terminal, a pair of parallel terminal base sidewalls extending downwardly from ends of the top portion to the bottom wall portions and between first and second sides of the base, each of the pair of terminal base sidewalls being provided with a slot extending between first and second portions of the terminal base sidewall adjacent the first and second sides of the base, respectively, the end of the slot in the first portion being lower than the end of the slot in the second portion;

a computer keyboard holder including a generally planar intermediate component which is adapted to support a computer keyboard, the generally planar intermediate component having first and second side portions and opposed end portions, a pair of parallel keyboard holder sidewalls extending upwardly from the end portions of the intermediate component and between the first and second side portions, each of the pair of keyboard holder sidewalls being provided with an aperture; and fastener means for securing the computer keyboard holder to the computer terminal base, the fastener means when securing the keyboard holder to the computer terminal base passing through the aperture in each of the keyboard holder sidewalls and the slot in the associated terminal base sidewall for sliding movement between the ends of the slot so that the keyboard holder may be moved between storage and use positions, and the fastener means cooperate with the ends of the slots to hold the keyboard holder either in a second use position inclined to the top of the base effected by the fastener means sliding upwardly in the ends of the respective slot ends in the second terminal base sidewall portions or in a storage position within the base when assembled to extend out the second side of the base for use, and whereby the keyboard holder may be disconnected from the base, removed out the second side, inserted in the first side to extend out the first side of the base for use, and reconnected to the base to hold the keyboard either in the first use position parallel to the top of the base or in a storage position within the base.

6. The combination as set forth in claim 5 wherein the distance between the center of the slot adjacent the first side of the computer terminal base and the upper surface of the bottom wall portions is just slightly greater than the distance between the centerline of the aperture in a each of the keyboard holder sidewalls and the bottom surface of the generally planar intermediate component so that the computer keyboard holder will be disposed in a position nearly parallel to the top portion of the computer terminal base when extended to its use position.

7. The assembly of a computer terminal base and a computer keyboard holder comprising:

a computer terminal base including generally planar top and bottom wall portions, and a pair of parallel terminal base sidewalls extending downwardly from ends of the top portion to the bottom wall portions and between the first and second sides of the base, each of the pair of terminal base sidewalls being provided with a slot extending between first and second portions of the terminal base sidewall adjacent the first and second sides of the base, respectively, the end of the slot in the first portion being lower than the end of the slot in the second portion;

a computer keyboard holder including a generally planar intermediate component having first and second sides and opposed end portions, the keyboard holder further including a pair of parallel keyboard holder sidewalls extending upwardly from the end portions, each of the pair of keyboard holder sidewalls being provided with an aperture; and fastener means for securing the computer keyboard holder to the computer terminal base, the fastener means passing through the aperture in each of the keyboard holder sidewalls and a slot in an associated terminal base sidewall for sliding movement between the ends of the slot so that the keyboard holder may be moved between storage and use positions, wherein the fastener means coooperate with the ends of the slots to hold the keyboard holder either in a second use position inclined to the top of the base effected by the fastener means sliding upwardly in the respective slot ends in the second terminal base sidewall portions or in a storage position within the base when assembled to extend out the second side of the base for use and whereby the keyboard holder may be disconnected from the base, removed out the second side, inserted in the first side to extend out the first side of the base, and reconnected to the base to hold the keyboard either in a first use position parallel to the top of the base or in a storage position within the base.

8. The combination as set forth in claim 7 wherein each of the slots is of a general L-shaped configuration having a horizontal leg and a vertical leg which extends upwardly from the horizontal leg, and wherein each of the slots includes a plurality of notches which intersect the vertical leg for receiving the fastener means at various heights.

9. The combination of a computer terminal base and a computer keyboard holder having front and rear portions, said computer terminal base including a generally planar top portion which is adapted to support a computer terminal, a bottom wall means, and a pair of parallel terminal base sidewalls extending between said top portion and said bottom wall means and between first and second computer terminal base sides, said computer terminal base configured to define a housing for said computer keyboard holder and having means defining first and second openings in the first and second base sides respectively for movement therethrough of said computer keyboard holder, means defining a slot in each of said base sidewalls which extends between a first end adjacent said first base side and a second end adjacent said second base side such that said first slot end is lower than said second slot end, the combination further comprising means for slidably coupling said computer keyboard holder rear portion to said slot means so that the keyboard holder extends out the first opening for use when assembled in one way and extends out the second opening for use when assembled in another way, wherein the coupling means cooperates with the ends of the slots to hold the keyboard holder either in a use position inclined to the top of the base effected by the coupling means sliding upwardly in the respective slot second ends or in a storage position within the base when assembled to extend out the second opening for use and wherein the keyboard holder may be disconnected from the base, removed out the second opening, inserted in the first opening to extend out the first opening for use, and reconnected to the base to hold the keyboard holder either in a use position parallel to the top of the base or in a storage position within the base.

10. The combination as set forth in claim 9 wherein each of the slots in the terminal base sidewalls is generally L-shaped, one leg of the L-shaped slot being parallel to the planar top portion of the computer terminal base, and the other leg of the L-shaped slot extending vertically above one end of the leg of the L-shaped slot which is parallel to the planar top portion.

11. The combination as set forth in claim 10 wherein each of the slots includes a plurality of vertically spaced apart notches which intersect the vertical leg for receiving the fastener means at various heights.

* * * * *